United States Patent [19]

van de Griend

[11] Patent Number: 4,560,893
[45] Date of Patent: Dec. 24, 1985

[54] ELECTRIC MOTOR

[75] Inventor: Jan M. van de Griend, Doredrecht, Netherlands

[73] Assignee: U.S. Philips Corporation, New York, N.Y.

[21] Appl. No.: 600,048

[22] Filed: Apr. 13, 1984

[30] Foreign Application Priority Data

Apr. 22, 1983 [NL] Netherlands .......................... 8301417

[51] Int. Cl.⁴ ............................................. H02K 1/04
[52] U.S. Cl. ........................................ 310/43; 310/44; 310/74; 310/268; 74/573 R
[58] Field of Search ................... 310/43, 44, 268, 74; 74/572, 573

[56] References Cited

U.S. PATENT DOCUMENTS

| | | | |
|---|---|---|---|
| 3,365,351 | 1/1968 | Maaz et al. | 74/572 X |
| 3,418,505 | 12/1968 | Mihalko et al. | 310/266 |
| 3,993,920 | 11/1976 | Sato | 310/268 X |
| 4,083,735 | 4/1971 | Caramanian | 74/573 X |
| 4,132,910 | 1/1979 | Kiss | 310/44 X |
| 4,346,773 | 8/1982 | Hofbauer et al. | 74/572 X |

FOREIGN PATENT DOCUMENTS 1354653  1/1964  France .

Primary Examiner—Donovan F. Duggan
Attorney, Agent, or Firm—Robert S. Smith

[57] ABSTRACT

In an electric motor, for example as used in audio or video apparatus, the rotor comprises a disk-shaped carrier of synthetic resin in which coils are accommodated. In order to stimulate a uniform running of the motor the mass of the rotor is increased by manufacturing the carrier from a synthetic resin filled with a filler having a high specific mass.

1 Claim, 1 Drawing Figure

U.S. Patent        Dec. 24, 1985        4,560,893
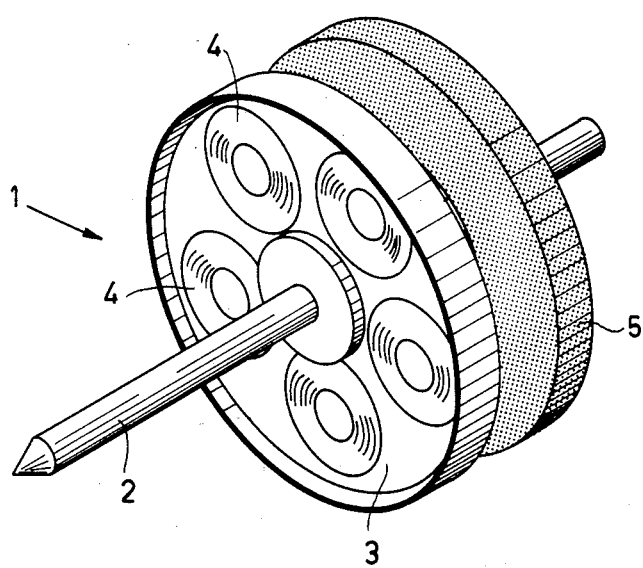

ELECTRIC MOTOR

The invention relates to an electric motor, for example for use in apparatus for audio or video-recording or reproduction, comprising a rotor which has a disk-shaped support of synthetic resin, said support comprising coils.

Such an electric motor is known, for example, from U.S. Pat. No. 3,997,806.

During one revolution of the rotor, the coils are magnetized in varying directions and traverse differently oriented magnetic fields. As a result of this, accelerations and retardations of the rotor will occur during one revolution. However, it is often of importance, for example if the electric motor is used in the above-mentioned apparatus, for the rotor to have a very constant speed of rotation.

It is the object of the invention to improve the uniformity of the speed of rotation in an electric motor of the above-mentioned type in a manner which is simple and cheap in the manufacture, which motor is characterized in that the synthetic resin from which the disk-shaped carrier is manufactured is mixed with a material having a specific mass which is higher than that of the synthetic resin, as a result of which the carrier with the coils also functions as a fly-wheel.

It is known per se from DE-OS No. 1 538 827 to use a synthetic resin mixed with a metal oxide in a rotor for an electric motor. However, the known rotor which is constructed as a hollow cylinder does not at all resemble the flat rotor in the motor according to the invention. In the known rotor only a thin layer of synthetic resin is provided around the rotor as an envelope for the coils, the object of the metal oxide being to increase the coefficient of thermal expansion of the synthetic resin to improve the heat dissipation by the rotor. Moreover, the metal oxide causes a reduction of the mass moment of inertia of the rotor. In the motor according to the invention, on the contrary, there is a disk-shaped carrier of synthetic resin in which the coils are embedded and in which the metal oxide serves to increase the mass amount of inertia of the rotor. Problems as regards the heat dissippation do not occur due to the nature of the construction.

A preferred embodiment of the motor in accordance with the invention is characterized in that the material with which the synthetic resin of the carrier is mixed consists mainly of lead oxides. As a result of the high specific mass, the mass moment of inertia of the rotor can be considerably increased by means of a limited quantity of lead oxide.

The invention will now be described in greater detail with reference to the description of an embodiment shown in the FIGURE.

The FIGURE is a perspective view of a rotor of an electric motor which comprises a shaft 2 having a disk-shaped carrier 3 for the coils 4. The coils are alternately connected in known manner to an electric supply source by means of a commutator which is not shown for reasons of clarity. During rotation of the rotor the coils 4 intersect magnetic fields originating, for example, from annular permanent magnets 5 accommodated one on each side of the carrier 3 and of which only one is shown to avoid complexity of the drawing.

As a result of the interaction between the coils 4 and the magnets 5, forces are formed which vary in value and which will cause couples on the rotor varying in value. The resulting accelerations and retardation of the speed of rotation of the rotor are inversely proportional to the mass of the rotor. Apart from separate speed controls, an extra mass of the rotor will hence be favorable for a circumferential speed of the rotor which is as constant as possible.

The carrier 3 is manufactured from a synthetic resin which is mixed with a material having a higher specific mass. In this manner the overall mass of the rotor can be increased without this requiring separate elements, for example, a separate fly-wheel.

The absence of such extra elements is favorable as regards the manufacturing costs of the rotor and it also has a space-saving effect.

The specific mass of most synthetic resins is approximately 1 g per cubic centimeter. The addition of the filler with which the synthetic resin is mixed will, of course, have the more effect according as the specific mass thereof is larger than that of the synthetic resin and according as more of it is added. However, limits are imposed by requirements imposed on the physical and mechanical material properties, for example, rigidity, miscibility, bonding, temperature resistance, processibility in injection molding machines, electrical insulation etc. of the combination of synthetic resin and filler.

In practice the combination of a polyamide mixed with lead oxide proves to be very satisfactory. The mass of the carrier may be increased by approximately a factor 5 with respect to a carrier of synthetic resin without admixture. As a result of this the carrier with coils also serves to a considerable extent as a fly-wheel. Other combinations of a thermoplastic or thermosetting synthetic resin, for example on the basis of phenol or urea, with a heavy filler are also possible, however. The carrier with the coils is preferably manufactured as a single component in a matrix by injection moulding.

What is claimed is:

1. An electric motor comprising a rotor which has a disk-shaped carrier manufactured of a synthetic resin, said carrier comprising coils, means for increasing rotational inertia of said carrier, said means including lead oxide embedded in said synthetic resin, said synthetic resin and lead oxide being injection molded surrounding said coils.

* * * * *